INVENTOR.
JAMES L. MADDOX
BY
Deane V. Hazeltine
ATTORNEY

PARALLEL BINARY ADDER-SUBTRACTER CIRCUITS

Filed Nov. 21, 1955

INVENTOR.
JAMES L. MADDOX
BY
Allen V. Hazeltine
ATTORNEY

INVENTOR.
JAMES L. MADDOX
BY
[signature]
ATTORNEY

INVENTOR.
JAMES L. MADDOX

BY

ATTORNEY

United States Patent Office 2,954,168

Patented Sept. 27, 1960

2,954,168

PARALLEL BINARY ADDER-SUBTRACTER CIRCUITS

James L. Maddox, Philadelphia, Pa., assignor to Philco Corporation, Philadelphia, Pa., a corporation of Pennsylvania Filed Nov. 21, 1955, Ser. No. 548,030

16 Claims. (Cl. 235—175)

The present invention relates to computer circuits and more particularly to adder-subtracter circuits for use in digital computers.

Computer circuits may employ an adder circuit, a subtracter circuit or a combined adder-subtracter circuit as required by the intended function of the computer. In a typical binary computer employing parallel transfer of data, the adder subtracter circuit may receive the addend or subtrahend from the input register and the augend or minuend from the master rank of a two rank accumulator register. In the conventional form of adder-subtracter circuits, $n$ substantially identical adder-subtracter stages are provided, where $n$ is the digital capacity of the input register and the accumulator master rank. Each stage is arranged to receive one digit from a corresponding bi-stable circuit in the input register, a second digit from a corresponding bi-stable circuit in the accumulator master rank and a carry or borrow digit from the next lower order adder-subtracter stage. Each adder-subtracter stage supplies a signal to still another register, this signal being representative of the sum or difference of the digits supplied by the input register, the accumulator master rank and the carry or borrow digit from the next lower order adder-subtracter stage. It also provides a carry or borrow signal which is supplied to the next higher order adder-subtracter stage. The parallel transfer of digits from the input register and the accumulator to a plurality of adder-subtracter stages is employed in the interest of minimizing the time required to perform an addition or subtraction step.

One factor which limits the maximum rate of operation of multi-digit parallel adder circuits, subtracter circuits or combined adder-subtracter circuits is the carry or borrow ripple which is propagated from the lowest order digit toward the higher order digits. For example, suppose that in a twenty digit computer a carry is indicated in the lowest order adder-subtracter stage. The occurrence of a carry in the lowest order stage may cause a carry to be present in the output of the next higher order stage where no carry existed before. If this is true, the sum and carry signal of the third and perhaps all higher order stages may change in response to the carry signal as it is successively transferred to high order stages. To take a specific example, suppose that in a twenty digit computer the number present in the accumulator master rank comprises two "zeros" followed by eighteen "ones." Suppose the number to be read into the input register comprises nineteen "zeros" followed by a "one." If the adder-subtracter is set to add, a fraction of a microsecond after the introduction of the number in the input register the first and second highest order adder-subtracter stages will indicate a sum of "zero" and a carry of "zero." The next seventeen stages will indicate a sum of "one" and a carry of "zero." However, the lowest order stage will indicate a sum of "zero" and a carry of "one." The carry of "one" from the lowest order stage will reset the next higher order stage to indicate a sum of "zero" and a carry of "one." The time required to accomplish this resetting will depend on the circuit constants of the adder-subtracter stage but is typically of the order of a tenth of a microsecond. The carry from the next to the lowest order stage will be propagated to the next higher order stage where another tenth of a microsecond will be expended in resetting this stage. In the example chosen above, this resetting operation will proceed in a serial fashion through the nineteen lower order stages, taking of the order of a tenth of a microsecond per stage to accomplish the resetting operation. Therefore the entire time required to accomplish an addition step if a ripple is present is of the order of two microseconds. This should be contrasted to an add time without ripple of one or two tenths of a microsecond. In general, a computer having a capacity of $n$ bits or digits and requiring $s$ seconds to accomplish the resetting operation will have a maximum carry or borrow ripple time of $ns$ seconds. In most instances it is not practical to provide gating circuits for determining the completion of the carry ripple for every possible combination of addend and augend or subtrahend and minuend. Therefore it is the usual practice to allow a time equal to the maximum possible ripple time for each addition or subtraction step.

The disadvantages of the serially propagated carry ripple have been recognized in the past and circuits for providing simultaneous carry propagation have been proposed. In these proposed arrangements, gate circuits connect each adder-subtracter stage to all preceding stages. All carries are generated simultaneously in this arrangement so that ripple time is completely eliminated. The disadvantage of this proposed system lies in the fact that the number of gate circuits required increases very rapidly as the digital capacity of the computer is increased so that it becomes impractical to employ such an arrangement in computers having a capacity of more than a few digits, for example five or ten digits. Also, combined adder-subtracter stages may require much more equipment than either an adder or a subtracter circuit.

Other proposals have been made to arrange the stages in groups with simultaneous carry within groups and serial carry between groups in order to effect a compromise between ripple propagation time and equipment requirements. In this arrangement the carry ripple time is proportional to the number of groups employed. If a small number of groups are employed in order to reduce ripple time the equipment required in each group is quite large. If a large number of groups are employed in order to conserve equipment, the ripple time will still be undesirably long.

The present invention overcomes these disadvantages of the prior art by arranging the adder stages, subtracter stages or combined adder-subtracter stages in groups of preselected size, and by providing for the simultaneous initiation of the carry ripple in each of the groups. The carry propagation within groups may be serial or simultaneous as desired.

Therefore it is an object of the present invention to provide a relatively simple adder-subtracter circuit having a relatively short ripple time.

In particular, it is an object of the invention to provide novel adder circuits, subtracter circuits or combined adder-subtracter circuits in which the carry or borrow ripple time is reduced to the ripple time of relatively small groups of stages within the circuits.

A further object of the invention is to provide an adder and/or subtracter circuit so arranged that the digital capacity thereof may be readily changed.

In general these and other objects of the invention are achieved by arranging the stages in groups. Stages in each group except the lowest order group are arranged to provide dual signal paths. The arrangement of the circuits of each path is such that there is an apparent carry of "one" supplied to the lowest order stage of one path of each group, and an apparent carry of "zero" supplied to the lowest order stage of the other path of each group. Each group provides a first sum and a first carry from the path having a carry of "zero" supplied thereto, and a second sum and a second carry from the path having a carry of "one" supplied thereto. A gate circuit associated with the carry output of each group determines the carry and sum pair which will be gated out of the following group to the utilization circuit. The carry ripple starts simultaneously in all groups and the total ripple time is approximately that of the longest group in the adder and/or subtracter circuit.

For a better understanding of the invention together with other and further objects thereof reference should now be made to the following detailed description which is to be read in conjunction with the accompanying drawings in which.

Figure 1:
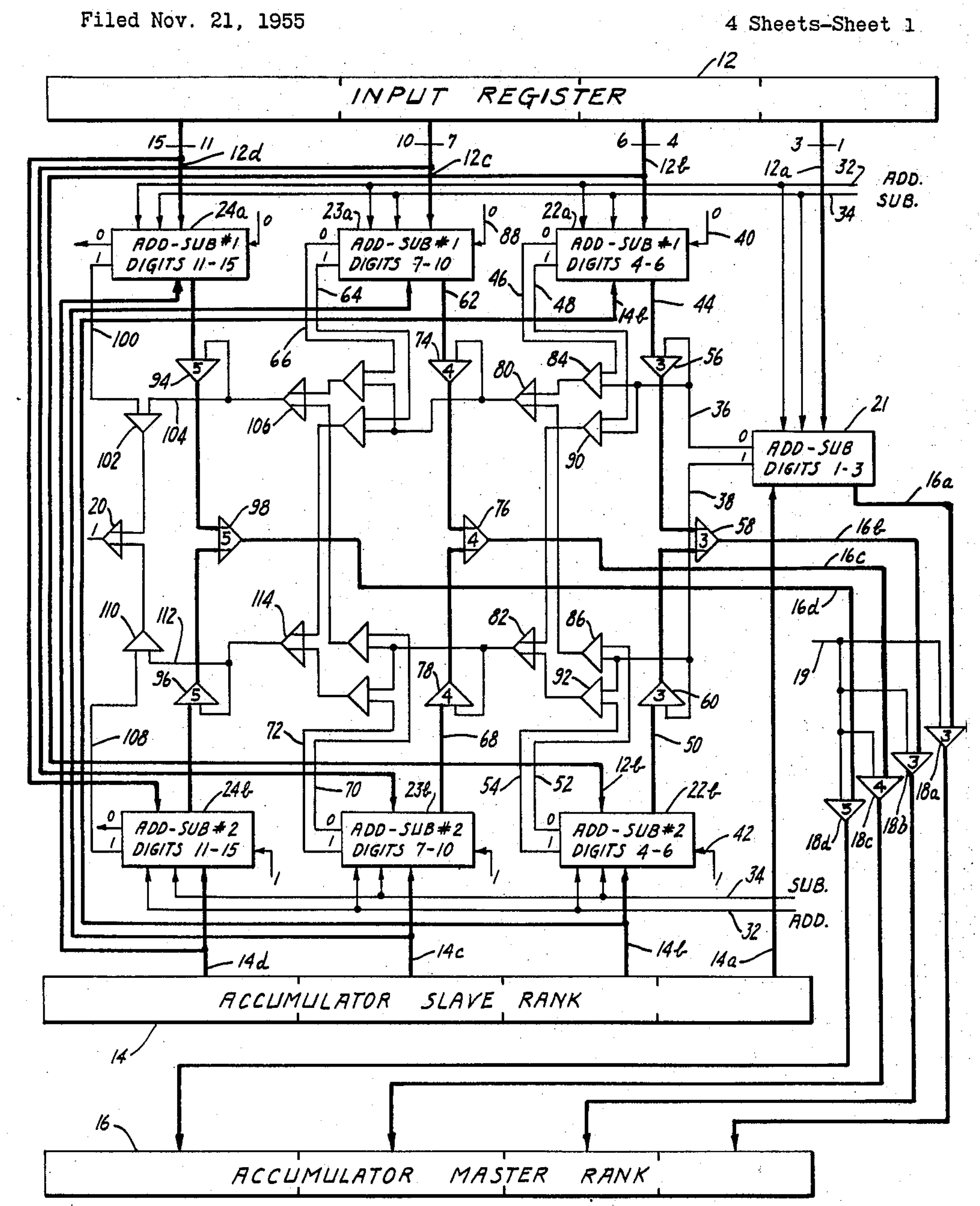
Fig. 1 is a block diagram of a preferred embodiment of the present invention.

Fig. 1 shows the adder-subtracter circuit of the present invention connected to registers 12, 14 and 16 which may serve as an input register, an accumulator slave rank and an accumulator master rank, respectively. In the arrangement shown in Fig. 1 the adder-subtracter circuit has one group of input leads 12a–12d connected to register 12, a second group of input leads 14a–14d connected to register 14 and a group of output leads 16a–16d connected to register 16 through gates 18a–18d, respectively. Gates 18a–18d are controlled by a signal on conductor 19. Typically the adder-subtracter of Fig. 1 would receive the addend or subtrahend from the register 12, the augend or minuend from the register 14, and supply the sum or difference to the register 16. The final carry or borrow signal of the adder-subtracter is supplied by "or" gate 20. In a typical computer, register 12 might comprise a plurality of independent bi-stable circuits, such as Eccles-Jordan trigger circuits, together with appropriate gates for clearing the register and for reading in information from some external source, for example a memory section of the computer. The clearing circuits and input gates are not shown in Fig. 1 since they do not form a part of the present invention. Similarly, registers 14 and 16 may each comprise a like plurality of bi-stable circuits together with appropriate transfer gates and clearing circuits. In a typical computer a plurality of sets of transfer gates would be provided between registers 16 and 14. One set of gates might transfer the data in register 16 to register 14 with a one digit left shift. A second set might accomplish the transfer with a one digit right shift. Again these gates have not been shown in Fig. 1 since they do not form a part of the present invention.

In the description which follows it is assumed that registers 12, 14 and 16 each have a capacity of fifteen binary digits. It is also assumed that the adder-subtracter has a capacity of fifteen binary digits and that the circuits for accomplishing the addition and subtraction are arranged in four groups, namely groups 21, 22, 23 and 24. Each of the groups 22, 23 and 24 comprises two adder-subtracter circuits 22a—22b, 23a—23b and 24a—24b. Each of the circuits 22a, 23a and 24a may be a conventional adder circuit having a capacity of a few digits, typically 3, 4 or 5.

Figures 2, 2A:
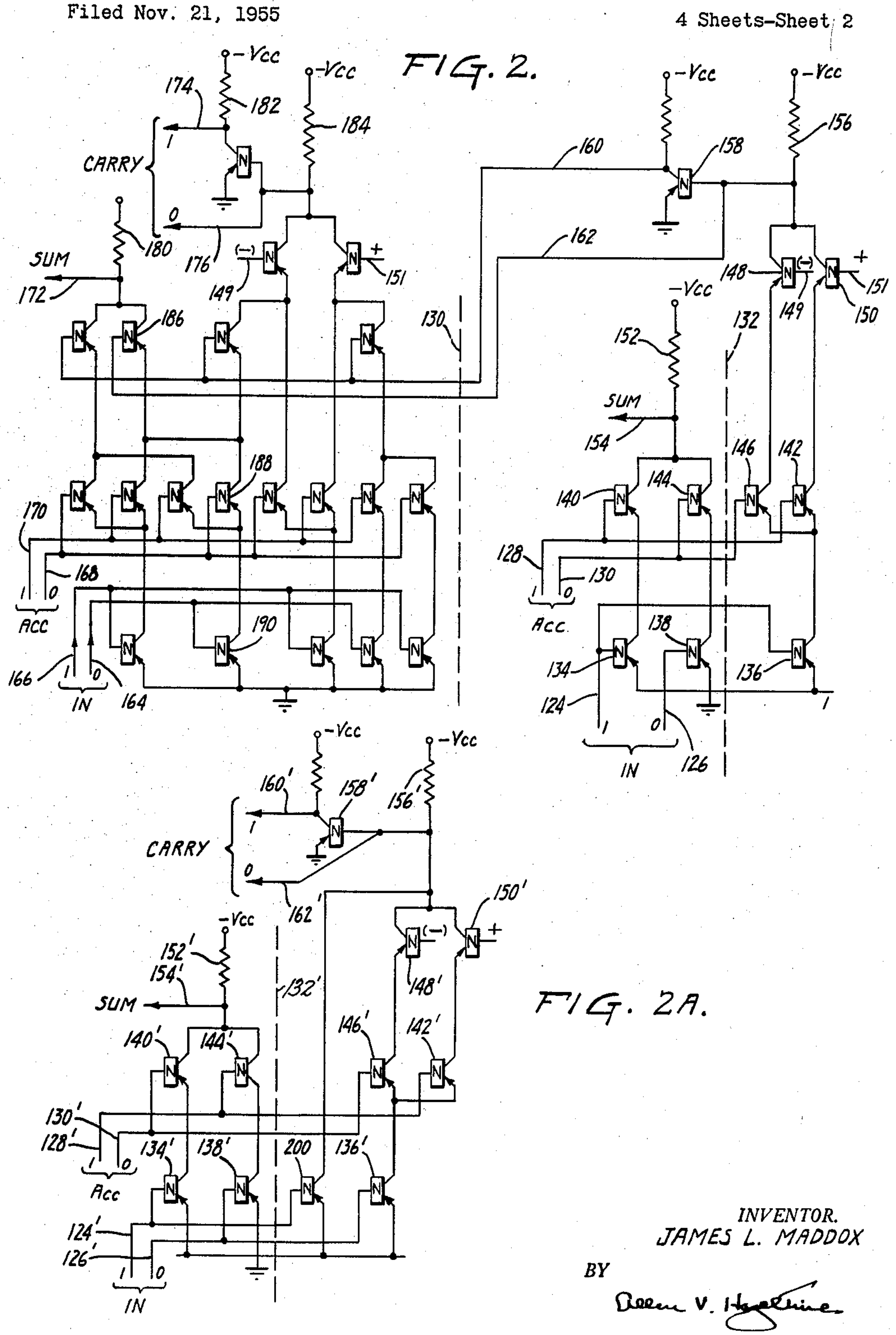
Fig. 2 is a circuit diagram of a two stage adder-subtracter chain which may be employed in the circuit of Fig. 1.
Fig. 2A is a modification of a portion of the circuit of Fig. 2.

Fig. 2 illustrates a two stage adder-subtracter of the type which may be employed in group 21 and in circuits 22a, 23a and 24a of groups 22, 23 and 24. The circuits 22b, 23b and 24b may be similar to the circuit shown in Fig. 2 except the lowest order stage may be modified as shown in 2A.

It should be understood that the present invention is not to be limited to the number of groups shown or to the digit capacity of each of the groups which may be mentioned from time to time. It lies within the scope of the invention to provide as few as two groups or as many groups as there are digits in the numbers to be added or subtracted. The digit capacity of each group may vary from one to one less than the total number of digits. However, as the description which follows will indicate, it is generally preferable to employ more than the minimum of two groups, each group including a small but not necessarily equal number of individual adder-subtracter stages.

The bi-stable circuits in input register 12 registering the lowest order digits of the addend or subtrahend are connected to group 21 by way of connection 12a. It was assumed above that the circuits of group 21 had a capacity of three binary digits. Therefore connection 12a will include three conductors or three pairs of conductors, each conductor or each pair of conductors connecting one of the three lowest order stages of register 12 to a corresponding adder-subtracter stage in group 21. Signals representing the three lowest order digits of the augend-minuend are supplied to group 21 by way of connection 14a. Again, connection 14a will include three conductors or three pairs of conductors but it is represented by a single line in the interest of simplifying the drawing. In a binary system the only digits that must be represented are "zero" and "one." Therefore it is convenient to employ an on-off type signal. In the description which follows it will be assumed that an input is energized or that a signal is present at an input if the potential of the input is other than ground. Conversely an input is not energized or a signal is not present at an input if the potential of the input is substantially at ground potential.

A signal on "add" lead 32 conditions group 21 to provide three outputs signals representing the three sum digits to connection 16a. These three signals follow separate paths through "and" gate 18a to the three lowest order bi-stable circuits in register 16. The numeral "3" within the triangle representing "and" gate 18a indicates the three separate paths. A signal on "subtract" lead 34 conditions group 21 to provide three signals by the same path, the signals this time representing the difference obtained by subtracting the three lowest order digits present in one of registers 12 and 14 from the three lowest order digits present in the other of these two registers. The circuits of group 21 also supply a signal on lead 36 if the final carry or borrow resulting from the addition or subtraction of the three digits in register 12 to or from the three digits in register 14 is a "zero". A signal appears on line 38 if the final carry or borrow is a "one".

As mentioned earlier, each of the higher order groups comprises two adder-subtracter circuits, each circuit including one or more adder-subtracter stages. In group 22 the first circuit is represented by block 22a and the second circuit is represented by block 22b. Circuits 22a and 22b are each connected to the same group of bi-stable circuits in register 12 by way of multiconductor connections 12b. In the discussion which follows it will be assumed that circuits 22a and 22b have a capacity of three binary digits and hence are connected to three bi-stable circuits in register 12. Similarly, circuits 22a and 22b are connected to three bi-stable circuits in register 14 by way of multiconductor connections 14b. Circuits 22a and 22b are each connected to "add" lead 32 and the subtract lead 34. The arrow 40 associated with circuit 22a schematically represents that the lowest order stage of this circuit is so arranged that an input carry of "zero" is represented in the carry and sum or borrow and difference output signals of this lowest order stage. It should be understood that in an actual circuit it will not be necessary to supply a signal indicating a carry of "zero". In a binary adder stage the logic may be selected to represent either an input carry or borrow of "one" or "zero" as long as the value remains fixed. Similarly, arrow 42 associated with circuit 22b schematically represents that the lowest order stage of this circuit is so arranged that an input carry of "one" is represented in the carry and sum or borrow and difference output signals of this circuit. Thus circuit 22a can be set to provide an output signal which represents the sum of digits 4 to 6 of register 12 and the digits 4 to 6 of register 14 assuming that, in the normal addition of the binary numbers present in register 12 to the number present in register 14, no carry would take place from the third column to the fourth column. Similarly, circuit 22b would be set to provide the sum of the same digit groups but on the assumption that a carry would take place from the third column to the fourth column. Only one of these sums will be correct for the numbers actually registered in registers 12 and 14. The advantage of providing the two circuits is that the assumed carry signals are available as soon as the circuit is programmed to add. These assumed carry signals do not depend at all on any carry ripple propagated through circuit 21. As will be explained in more detail presently, gate circuits are provided for connecting to register 16 only the one of the two circuits 22b or 22a which is providing the correct sum.

Circuit 22a supplies a three-digit partial sum or difference to multiconductor connection 44, and a final carry or borrow signal to leads 46 or 48. If the carry or borrow is "zero", lead 46 will be energized. If the carry or borrow is "one", lead 48 will be energized. Similarly, circuit 22b supplies a three-digit partial sum or difference signal to multiconductor connection 50 and a carry or borrow signal to conductor 52 or conductor 54. Connections 46, 48, 52 and 54 represent single conductors or single signal paths. However, connections 44 and 50 represent three groups of conductors, one for each digit in the sum or difference.

"And" gate 56 has the inputs thereof connected to connection 44 and conductor 36. Therefore "and" gate 56 will provide three separate output signals provided conductor 36 is energized. As mentioned earlier, conductor 36 will be energized if the carry or borrow signal supplied by group 21 represents a "zero". The output of gate circuit 56 is connected through "or" buffer 58 and gate circuit 18b to the appropriate bi-stable circuits in register 16. Similarly, a three-digit sum or difference signal present on connection 50 is supplied to an "and" gate circuit 60. Again gate circuit 60 is capable of separately handling a three-digit signal. A second input of "and" gate 60 is connected to conductor 38 from group 21. The output of gate 60 is connected to the second input of "or" buffer 58. "And" gate 60 will provide output signals only if the carry signal from group 21 is a "one".

Adder-subtracter circuits 23a and 23b in group 23 each receive inputs from the seventh to the tenth bi-stable circuits in registers 12 and 14. Circuit 23a provides sum or difference signals on multiconductor connection 62, and a carry or borrow signal on conductor 64 or 66. Circuit 23b provides sum or difference signals on multiconductor connection 68, and carry signals on leads 70 and 72. The sum or difference signals from circuit 23a are supplied to register 16 through "and" gate 74, "or" buffer 76 and "and" gate 18c. The connection from gate 18c to register 16 is to the seventh to the tenth bi-stable circuits in this register. Similarly, the sum or difference signals from circuit 23b are supplied by way of "and" gate 78, "or" buffer 76 and "and" gate 18c to the same four bi-stable circuits in register 16. The gating of the sum or difference signals to register 16 is similar to the gating of the sum or difference signals from circuits 22a and 22b except that one additional variable has been added. Instead of two possible carry signals for controlling the gating of these sum or difference signals there are now four carry signals, two each from circuits 22a and 22b. The operation of gates 74 and 78 are controlled by signals received from "or" buffers 80 and 82, respectively. Each buffer has two inputs. The first input of buffer 80 is received from "and" gate 84 and the second from "and" gate 86. "And" gate 84 has its two inputs connected to conductors 46 and 36. Therefore this gate will provide an output signal if the sum or difference of digits four to six is gated out of 22a and if the carry or borrow of circuit 22a is "zero". "And" gate 86 has its two inputs connected to conductors 52 and 38. Therefore "and" gate 86 will have an output signal if the sum or difference of digits four to six is gated out of circuit 22b and if the carry or borrow of circuit 22b is a "zero". It should be noted that in each case the carry or borrow signal from the preceding group has to be "zero" before the sum or difference is gated out of circuit 23a. This carry of "zero" corresponds to the assumed carry of "zero" represented by the arrow 88 associated with circuit 23a. "Or" buffer 82 has its two inputs connected to "and" gates 90 and 92, respectively. "And" gate 90 is supplied with signals by conductors 48 and 36. "And" gate 92 is supplied with signals from conductors 54 and 38. Therefore "or" buffer 82 will have an output signal if the selected circuit in group 22 has an output carry of "one". The means employed for gating the sum from circuits 24a and 24b to register 16 are similar to those associated with circuits 23a and 23b. The only difference lies in the fact that "and" gates 94 and 96 and "or" buffer 98 must be capable of handling a five-digit sum or difference signal rather than the three-digit sum or difference signal handled by "and" gates 56 and 60 and the four-digit sum or difference signal handled by "and" gates 74 and 78.

The digital capacity of the adder-subtracter may be increased by adding groups similar to groups 22 or 23, or by increasing the digital capacity of one or more of the groups. There is no definite limit on the number of stages which may be included within each group, but proper selection of the relative number of stages within the several groups will result in the proper sum being gated from all groups to register 16 at the same time. It can be shown that this arrangement will give the minimum possible carry ripple time with a circuit of the present invention.

It should be noted that the carry outputs of group 21 and circuits 22a, 22b and 23a and 23b are employed only in gating circuits within the adder-subtracter. It is not necessary to employ these carry or borrow signals as data because each succeeding group initiates a new carry or borrow signal for each of the two circuits in the group. However, in the final group of the adder-subtracter, in this case group 24, it may be desirable to provide an indication of the final carry or borrow signal resulting from the addition or subtraction of the number in register 12 and the number in register 14. Therefore conductor 100 from circuit 24a is connected to one input of an "and" gate 102. Lead 100 is energized if the carry or borrow signal from circuit 24a represents a "one". The second input 104 is connected to the output of "or" buffer 106. "Or" buffer 106 supplies a signal if the carry or borrow signal of the selected circuit in group 23 is a "zero". It will be remembered that a carry of "zero" in group 23 selects a sum or difference signal from circuit 24a in group 24. Similarly, a connection is made by way of conductor 108 from circuit 24*b* to one input of an "and" gate 110. Lead 108 is energized if the carry or borrow output of circuit 24*b* is a "one". A second input of "and" gate 110 is connected by way of conductor 112 to the output of an "or" buffer 114. "Or" buffer 114 provides an output signal if the output carry of the selected circuit in group 23 is a "one". Therefore the output of "or" gate 20, which receives the output signals of gates 102 and 110, will be energized if the carry or borrow signal in the selected circuit of group 24 is a "one". It will not be energized if the carry or borrow signal in the selected chain is a "zero". The circuit for gating out the carry of "one" in group 24 may be duplicated to gate out a carry of "zero" from circuits 24*a* and 24*b*. However, this is not usually necessary since a carry of "zero" is indicated by the absence of a carry of "one", that is, by the absence of a signal from "or" buffer 20.

Fig. 2 illustrates a two stage adder-subtracter circuit of the type which may be employed in group 21 and in adder-subtracter circuits 22*a*, 23*a* and 24*a*. Only two stages are shown in Fig. 2 since additional stages in the circuit would merely duplicate the left hand stage of Fig. 2, that is, the portion of the circuit to the left of broken line 130. The right hand stage of Fig. 2 has input leads 124 and 126 which may be connected to the first, fourth, seventh or eleventh bi-stable circuit of register 12. That is, if the circuit of Fig. 2 illustrates the single adder-subtracter circuit of group 21, conductors 124 and 126 would be connected to the first or lowest order bi-stable circuit in register 12. If the circuit of Fig. 2 is taken to represent the circuit in 22*a*, then conductors 124 and 126 would be connected to the fourth bi-stable circuit in input register 12, again counting from the lowest order stage. In this case conductors 124 and 126 would form one pair of the three pairs of conductors represented by the connection 12*b* of Fig. 1. Conductor 124 will be energized if the bi-stable circuit in register 12 is registering a "one". Conductor 126 will be energized if the bi-stable circuit is registering a "zero". Conductors 128 and 130, which correspond to one pair of the three pairs of conductors represented by the connection 14*b* of Fig. 1, are provided for receiving the corresponding digit from register 14. Again conductor 128 will be energized if the bi-stable circuit in register 14 to which it is connected is representing a "one". Conductor 130 will be energized if this bi-stable circuit is registering a "zero". The right hand stage of Fig. 2 may be divided into two parts. The part to the left of broken line 132 generates the sum or difference digit which will be supplied to register 16. The portion of the circuit to the right of broken line 132 generates the carry or borrow digits which are supplied to the left hand stage of Fig. 2. No input carry signal is supplied to the right hand stage of Fig. 2 but the circuits are so arranged that the sum and carry outputs are those which would be present if a carry or borrow of "zero" were present. In group 21 the input carry or borrow will always be "zero" since there are no lower order digits to provide a carry or borrow signal to this group. Circuits 22*a*, 23*a* and 24*a* are so arranged that a carry of "zero" is assumed even though there are lower order digits which, in a conventional computer circuit, might provide a carry other than "zero".

In Fig. 2, the bases of transistors 134 and 136 are connected to conductor 124, while the base of transistor 138 is connected to conductor 126. Conductor 128 is connected to the bases of transistors 140 and 142, and the second conductor 130 from register 14 is connected to the bases of transistors 144 and 146. Conductors 149 and 151, which connect to the bases of transistors 148 and 150, respectively, are the "subtract" and "add" program conductors, respectively. Conductors 149 and 151 correspond to conductors 34 and 32 of Fig. 1. In the circuit of Fig. 2, a sum of "one" is indicated if conductor 154, which is connected to one end of resistor 152, is at a potential other than substantially ground potential, and a sum of "zero" is indicated if this conductor is at or near ground potential. To accomplish this result the end of resistor 152 remote from conductor 154 is connected to a source of supply potential schematically represented by the symbol $-V_{cc}$. PNP transistors and negative signals and supply potentials are assumed throughout this description, but it should be understood that other types of transistors or other forms of circuit elements, such as magnetic cores, neon tubes or the like, may be substituted therefor without departing from the scope of the invention.

The end of resistor 152 associated with conductor 154 is returned to ground through two parallel paths, one path being the emitter-collector paths of transistors 134 and 140 connected in series, and the second path being the emitter-collector paths of transistors 138 and 144 connected in series. It will be recognized that this forms a conventional portion of an adder-subtracter stage in which the four transistors are employed like on-off switches, the circuit between emitter and collector being substantially a short circuit if the conductor connected to the base is energized and substantially an open circuit if this conductor is not energized.

In the circuit of Fig. 2 a carry or borrow of "zero" is indicated if the lower end of resistor 156 is at a high potential. Again this is accomplished by returning one end of resistor 156 to the supply potential and connecting the other end to ground through two parallel paths comprising, respectively, the emitter-collector paths of transistors 148, 146 and 136 in series and the emitter-collector paths of transistors 150, 142 and 136 in series. It should be noted that transistor 136 is common to these two paths. The parallel combination of the emitter-collector paths of transistors 148 and 146 and the emitter-collector paths of transistors 142 and 150 are required since the carry digit resulting from the addition of two digits is not always the same as the borrow digit resulting from the subtraction of the same two numbers. The fact that no transistor in the carry-borrow portion of the circuit is connected to conductor 126 indicates that the carry or borrow digit will always be "zero" if the input carry is "zero" and the digit from register 12 is "zero." It should be noted that it is not necessary to provide transistors controlled by the add conductor 151 and/or the subtract conductor 149 in the left hand portion of this first stage since in binary arithmetic the sum digit resulting from the addition of two or more digits is the same as the difference digit resulting from the subtraction of these digits.

A signal representing a carry of "one" is generated by connecting the lower end of resistor 156 to the input of an inverter stage including transistor 158. Thus conductor 160, which is connected to the output of the inverter, will be at a high potential if the carry or borrow digit is "one." It should now be clear that the digit is a "borrow" digit if the subtract lead 149 is energized and that it is a "carry" digit if add conductor 151 is energized. Conductor 162, which is connected to the input of the inverter, that is to the lower end of resistor 156, will be energized, i.e. will be at a potential other than ground, if the carry or borrow digit is a "zero."

The left hand stage of Fig. 2 is similar to the stage just described except that it is made slightly more complex by the fact that the carry or borrow from the right hand stage may be either a "zero" or a "one."

Conductors 164 and 166 of Fig. 2 connect to the second, fifth, eighth or twelfth bi-stable circuit in input register 12. These bi-stable circuits are the second lowest order stages in each of the groups. Conductors 168 and 170 connect to the corresponding bi-stable element in register 14—that is, if conductors 164 and 166 connect to the fifth bi-stable element in register 12, then conductors 168 and 170 connect to the fifth bi-stable circuit of register 14. In this case conductors 164 and 166 would comprise a second pair of the three pairs of conductors represented by connection **12*b*, the first pair being conductors 124 and 126, and conductors 168 and 170 would comprise a second pair of the three pairs of conductors represented by connection 14*b*. Conductors 166 and 170 will be energized if the digits registered by the bi-stable circuits to which they are connected are "one." Conductors 164 and 168 will be energized if the respective digits are "zeros." In the left hand stage a sum or difference of "one" is indicated by a high potential on output conductor 172. A carry or a borrow of "one" is indicated by a high potential on conductor 174, and a carry or a borrow of "zero" is indicated by a high potential on conductor 176. A high potential will be present on each of these conductors by reason of their being connected to a source of supply potential through the resistors 180, 182 and 184, respectively, unless a path is completed from one or more of these conductors to ground through the transistor network. Conductors 174 and 176 may connect to additional adder-subtracter stages in the same manner that conductors 160 and 162 are connected to the left hand stage of Fig. 2. If the left hand stage of Fig. 2 is the last stage of one of the adder-subtracter circuits of Fig. 1, the signals appearing on conductors 174 and 176 are not employed as carry signals but are employed as gating signals for gating out the sum or difference of the following adder-subtracter circuit. For example, in group 21, conductor 174 would correspond to conductor 38 of Fig. 1 and conductor 176 would correspond to conductor 36 of Fig. 1. The operation of the left hand stage may be understood by tracing the various paths to ground from conductors 172, 174 and 176. For example, one path to ground from conductor 172 is by way of transistors 186, 188 and 190. These transistors are energized by conductors 162, 168 and 164, respectively. Thus digits of "zero" from register 12 and register 14 and a carry or borrow of "zero" from the right hand stage produce a sum or difference of "zero" at conductor 172**.

The adder-subtracter chains **22*b*, 23*b* and 24*b* of Fig. 1 may be made up of stages, all of which are similar to the left hand stage of Fig. 2, provided the carry "one" input to the lowest order stage is permanently energized by connecting it to a source of supply potential. This would introduce the assumed carry of "one" represented by arrow 42 of Fig. 1. However, the same result can be achieved with considerable saving in circuitry by slight modification of the right hand stage of Fig. 2. The modified right hand stage is shown in Fig. 2A. Parts in Fig. 2A have been given the prime numbers of corresponding parts in Fig. 2. The portion of the circuit to the left of broken line 132′ is similar to the corresponding circuit in Fig. 2 except that the connections to the bases of transistors 140 and 144 have been reversed. Note that in Fig. 2 the base of transistor 140 is connected to conductor 128. In Fig. 2A the base of transistor 140′ is connected to conductor 130′. Similarly, in Fig. 2 the base of transistor 144 is connected to the conductor 130. In Fig. 2A the base of transistor 144′ is connected to conductor 128. It can be shown that the signal present on conductor 154′ of Fig. 2A will be the proper signal to indicate the sum or difference of any combination of binary digits in registers 12 and 14 and a carry or borrow digit of "one." In the circuit to the right of broken line 132′ the only change that is required is the connection of the base of transistor 136′ to input conductor 126′ instead of conductor 124′, and the addition of a transistor 200 which provides a third path from the lower end of resistor 156′ to ground. Again it should be remembered that conductors 126′ and 124′ form one pair of the three pairs of conductors represented by the connection 12*b* of Fig. 1. The base of transistor 200 is connected to input conductor 124′. It can be shown that a carry or borrow digit will always be present if the digit in the input register is "one" and a carry or borrow digit of "one" is present from the preceding stage. Therefore there is no necessity of connecting transistor 200 in series with the add and subtract transistors 148′ and 150′. The carry or borrow signal appearing at leads 160′ and 162′ of Fig. 2A will represent the carry or borrow digit resulting from the addition of any combination of binary digits in registers 12 and 14 and a carry digit of "one." Conductors 160′ and 162′** of Fig. 2A connect to the succeeding stages in exactly the same way as the corresponding conductors in Fig. 2.

The circuits shown in Fig. 2 and Fig. 2A may be set to add or subtract as desired. If only addition is required the circuits may be simplified by eliminating all transistors energized by the subtract program conductors 149 and all other transistors in paths which must be completed through these subtract transistors. For example, in Fig. 2 transistors 148 and 146 may be removed but not transistor 136 since a path may be completed through this transistor and transistors 142 and 150. Transistor 150 may be replaced by a permanent connection between resistor 156 and the collector 142 since the circuit is now always programmed to add. If only subtraction is to be performed, the paths involving the transistors energized by the "add" program conductor 151 may be removed and the transistors energized by the "subtract" program conductor 149 may be replaced by permanent connections.

Figure 3:
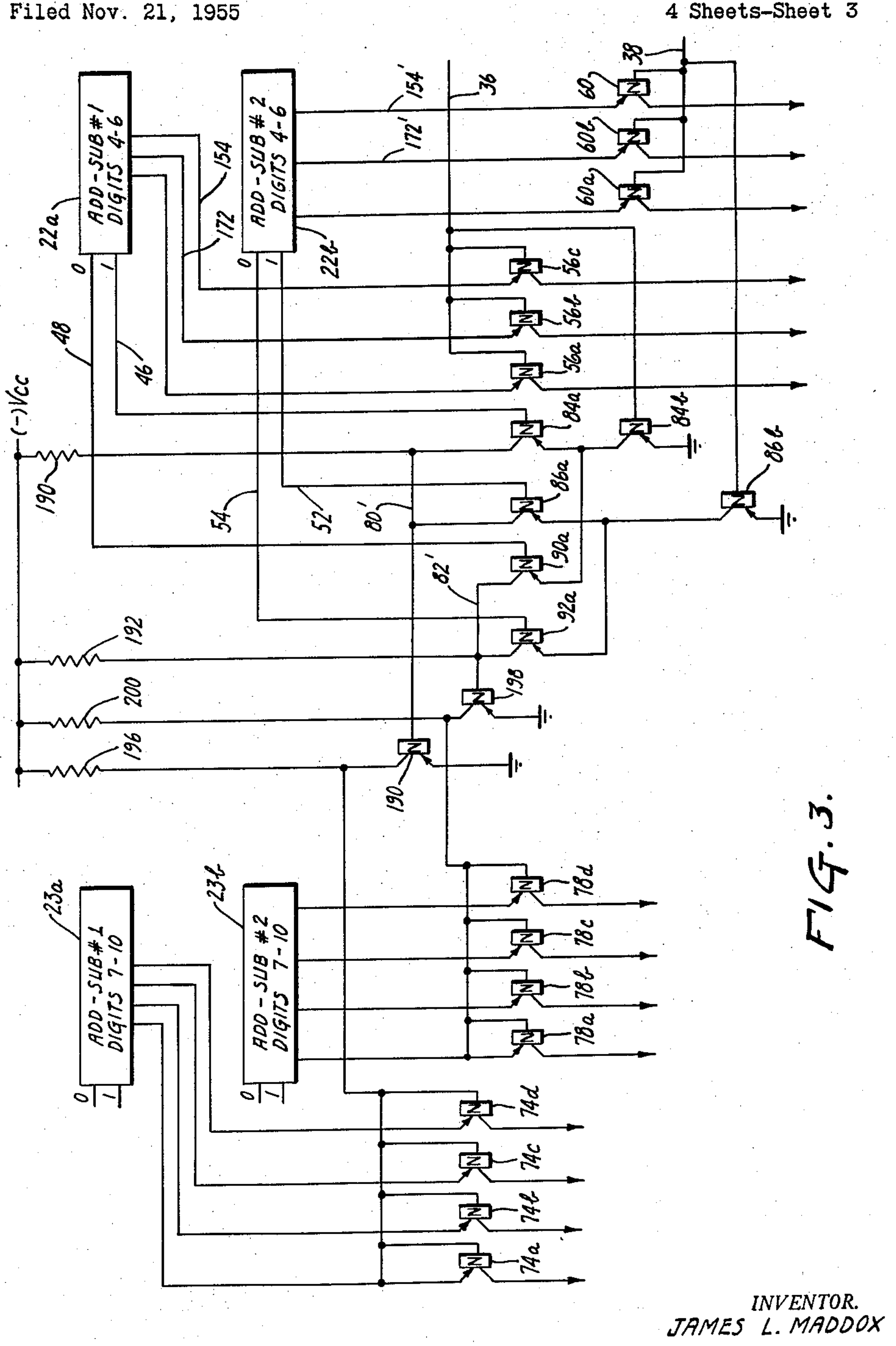
Fig. 3 is a circuit diagram of one preferred form of gate circuit employed between adjacent groups in the circuit of Fig. 1.

Fig. 3 is a circuit diagram of the gating circuits connecting adder-subtracter circuits **22*a* and 22*b* to adder-subtracter circuits 23*a* and 23*b* of Fig. 1. As shown in Fig. 3, gate circuits 56 comprise three transistors, 56*a*, 56*b* and 56*c*, the bases of which are energized in parallel from conductor 36. Similarly, gate circuit 60 comprises three transistors, 60*a*, 60*b* and 60*c*, the bases of which are energized in parallel from conductor 38. In Fig. 3, "and" gate 84 comprises the transistors 84*a* and 84*b* in series. The series combination of these two transistors provides the desired "and" function. "And" gate 86 is formed by transistors 86*a* and 86*b* in series. The collectors of transistors 84*a* and 86*a* are returned to a source of supply potential represented by the symbol $-Vcc$ through a load resistor 190. "And" gate 90 comprises the transistor 90*a* and transistor 84*b* in series combination. Note that the single transistor 84*b* takes the place of the two connections from lead 36 to the "and" gates 84 and 90 of Fig. 1. "And" gate 92 comprises transistor 92*a* and transistor 86*b* in series. The collectors of transistors 92*a* and 90*a* are returned to the supply potential through load resistor 192. The function of "or" gate 80 is performed in Fig. 3 by the common connection 80′ between the collectors of transistors 84*a* and 86*a*. Conductor 80′ is connected to the base of a transistor 194. This transistor and resistor 196 together form a buffer stage. The output of the buffer stage including transistor 194 is connected to the bases of the four transistors 74*a*–74*d* making up "and" gate 74. A second transistor 198 is energized by conductor 82′ which performs the function of the "or" gate 82 shown in Fig. 1. This buffer stage is completed by a load resistor 200. Buffer stage 198–200 controls the operation of transistors 78*a*–78*d* which form "and" gate 78**.

The circuit of Fig. 3 operates in the following manner. The transistors making up gate circuits 56 and 60, for example, will act as a high impedance in the absence of a signal on the bases thereof. Either conductor 36 or conductor 38 will be energized depending upon the carry signal supplied by group 21 of Fig. 1. If conductor 36 is energized, the three transistors **56*a*–56*c* making up gate 56 will appear as a very low impedance, thereby permitting any signal which may be present on one of the leads from adder-subtracter circuit 22*a* to be communicated to the associated bi-stable circuit in register 16. Similarly, if conductor 38 is at a high potential indicating a carry signal of "one" in the output of group 21, the transistors 60*a*–60*c* in gate circuit 60** will appear as a low impedance thereby permitting any signals present on the conductors 154′, 172′, etc. of circuit 22*b* to be communicated to the corresponding bi-stable circuits in register 16. The proper sum from group 23 is selected in the following manner. Suppose conductor 36 is energized, thereby selecting the sum from group 22*a*. The high potential on conductor 36 will cause transistor 84*b* to appear as a low impedance. The base of only one of the two transistors 84*a* and 90*a* will be energized by a signal from the carry output of group 22*a*. Suppose for example that the carry output of group 22*a* is a "one" so that conductor 48 is energized. The signal on the base of transistor 90*a* will cause it to act as a low impedance. Therefore a circuit is completed from ground through transistor 84*b* and transistor 90*a* to the resistor 192. This connection will cause the lower end of resistor 192 to assume a potential only slightly above ground potential. The low potential at the lower end of resistor 192 will cause transistor 198 to be cut off. The collector of transistor 198 will be at a high potential since it is returned to the supply potential through resistor 200. The high potential at the collector of transistor 192 will supply a high potential to the bases of the transistors 78*a*–78*d* making up gate 78. This will permit the output signal of circuit 23*b* to be supplied to register 16. It should be noted that if conductor 36 is at a high potential, conductor 38 will be at a low potential. A low potential on the base of transistor 86*b* will cause this transistor to act as a high impedance. Therefore the lower end of resistor 190 will be at a high potential since the path to ground through transistors 86*a* and 86*b* is blocked by the high impedance of the latter transistor. The parallel path through transistor 84*a* and transistor 84*b* is blocked by the high impedance of transistor 84*a* resulting from the absence of a "zero" carry signal on conductor 46. The high potential at the lower end of resistor 190 is supplied to the base of transistor 194 causing this transistor to conduct. Conduction through transistor 194 drops the potential of the lower end of resistor 196 to a value near ground. This low potential causes transistors in gate circuit 74 to be cut off, thus blocking the sum signal from adder-subtracter chain 23*a*. The other three combinations of carry signals from group 21 and carry signals from adder-subtracter circuits 22*a* and 22*b* may be traced through the circuit in a similar way.

The above description of Figs. 2, 2A and 3, which are detailed circuits of the parts of the circuit shown in Fig. 1, also serves as a description of the operation of Fig. 1. The gating circuit of Fig. 3 is merely duplicated between groups 23 and 24 or, in general, between all adjacent groups in the complete adder-subtracter. Therefore the capacity of the adder-subtracter may be increased by adding more groups similar in nature to groups 22 and 23. Adding groups in this manner will not cause any appreciable increase in the carry ripple time since the carry propagation in the two paths of the new groups will start simultaneously with the carry ripples in all other groups. Each added group will increase the over-all carry time by approximately the carry ripple time for one digit. Also the addition of the new groups will not require any alteration in the other groups since each group is independent of all other groups except for the gating signals received from preceding groups. Thus the circuit shown in Fig. 1 is ideally suited to a unit type circuit construction in which the capacity may be increased as the occasion demands by adding one or more prewired units of the appropriate type. A prewired unit would include two adder-subtracter circuits corresponding to circuits 22*a* and 22*b* for example and a series of gate circuits corresponding to gate circuits 56, 80, 84, 90, 58, 82, 86, 92, and 60 of Fig. 1. The added unit may be arranged to add 3, 4, 5 or more digits as desired. It is also possible to increase the capacity of the adder-subtracter circuit by replacing one or more of the groups of Fig. 1 with a new group having a greater or lesser number of stages in each circuit. This will have a direct effect on the ripple time but it will have no effect on the operation of the other groups.

The addition or subtraction step is complete when all sums or differences have been gated into register 16. The time duration of the carry ripple in each group is proportional to the number of stages in that group. The sum or difference is available for gating into register 16 as soon as this carry ripple is completed. However, the sum or difference cannot be gated out of group 24, for example, until the decision is made on which sum or difference and carry or borrow are to be gated out of group 23. This is so because the carry or borrow output of circuit 23*a* may be different from the carry or borrow output of group 23*b*. This will result in a minor "decision ripple" starting with group 22 and proceeding to group 24. The time duration of this decision ripple will be proportional to the number of groups employed and may be approximately equal to the carry or borrow ripple of a conventional adder-subtracter circuit having a number of stages equal to the number of groups. Thus it is possible to minimize the overall ripple time by employing a relatively small number of stages in the less significant groups, thus permitting the decision ripple to start at the earliest possible moment. The groups handling the more significant digits may have a greater number of stages since the sum or difference signal is not required of these stages until the completion of the carry ripple in the earliest group plus the completion of the decision ripple to the later group. It is for this reason that groups 21, 22, 23 and 24 are shown in Fig. 1 as comprising 3, 3, 4 and 5 stages, respectively. The overall ripple time of the 15 digit adder-subtracter of Fig. 1 is of the order of the ripple time of a six digit adder of conventional design. The maximum ripple comprises a three digit carry ripple in adder-subtracter 21 and three unit "decision ripple" in gates 56—60, 74—78 and 94—96. Therefore the ripple time has been cut by a factor of 2.5. This factor would be of the order of four for a forty digit adder-subtracter constructed in accordance with the principles of the present invention.

Figure 4:
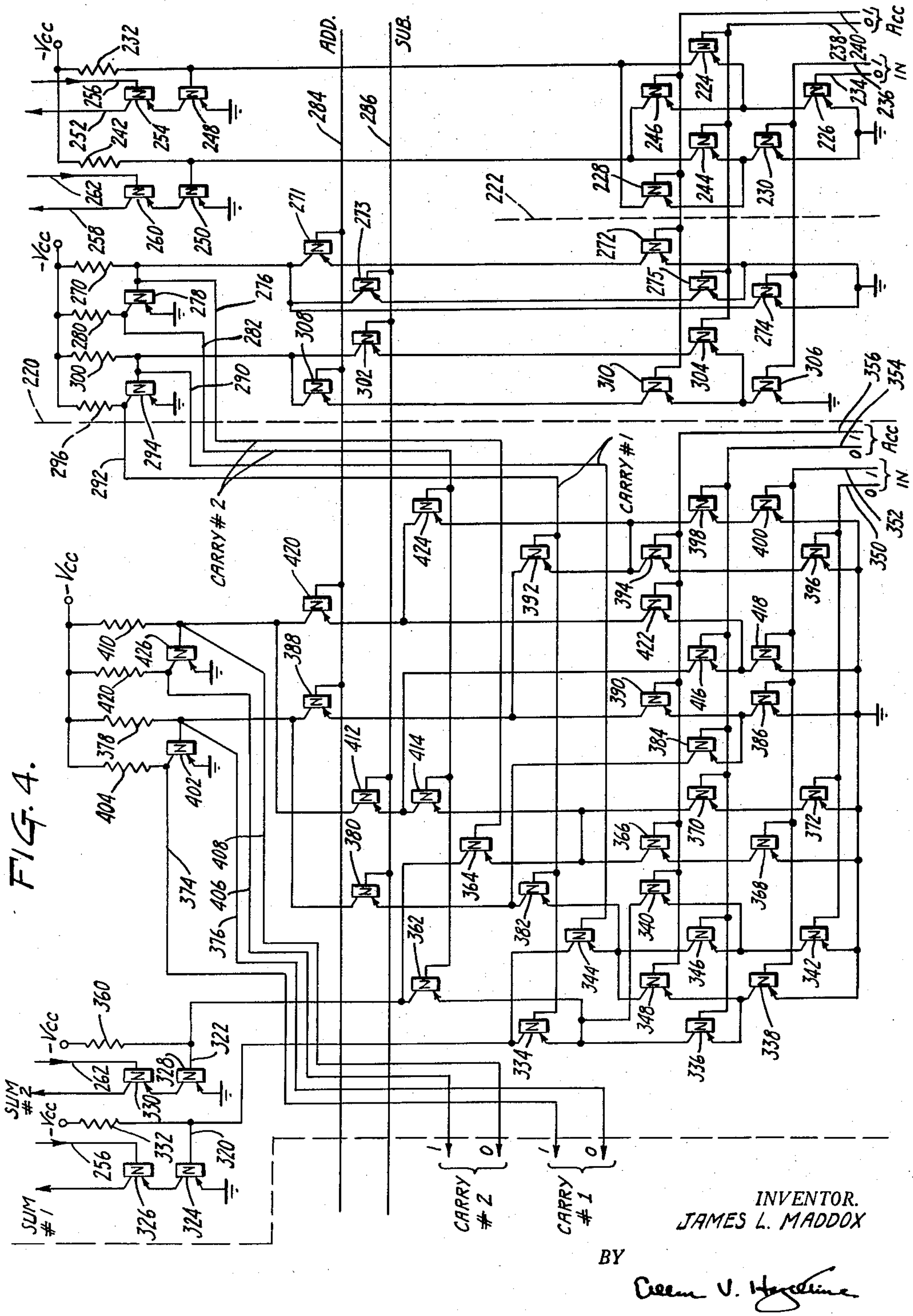
Fig. 4 is a circuit diagram of a preferred form of adder-subtracter circuit which combines the two signal paths into a single circuit.

The circuit of Fig. 4 combines the two adder-subtracter circuits of a group into a single circuit with a net saving of circuit components. Again in Fig. 4 only two stages have been shown since all stages except the lowest order stage in a group are identical. The lowest order stage is somewhat simpler than the higher order stage or stages since the carry input signals to this stage are fixed. In Fig. 4 the two stages are separated by the broken line 220, the lower order stage being the one on the right.

The right hand stage of Fig. 4 may be divided into two parts, the part to the right of broken line 222 providing the sum or difference signals and the part to the left of line 222 providing the carry or borrow signals. In the portion of the circuit to the right of line 222 transistors 224, 226, 228 and 230 are connected so as to provide two alternative paths to ground from the lower end of resistor 232. One path is through the emitter-collector paths of transistors 224 and 226 in series, and the other path is through the emitter-collector paths of transistors 228 and 230 in series. The other end of resistor 232 is returned to a source of supply potential represented in Fig. 4 by the symbol $-V_{cc}$. Therefore the lower end of resistor 232 will be at a high potential unless one of the two paths mentioned above provides a low impedance path to ground. Conductors 234 and 236 extend to a single bi-stable circuit (not shown) in a register corresponding to register 12 of Fig. 1. Conductor 234 will be energized if the digit stored by this bi-stable circuit is a "zero" and conductor 236 will be energized instead if the digit is a "one." Conductors 238 and 240 are associated with a corresponding bi-stable circuit in a register corresponding to register 14 of Fig. 1. Conductor 238 is energized if the digit registered by the bi-stable circuit is a "zero" and conductor 240 is energized if this digit is a "one." The bases of transistors 224, 226, 228 and 230 are connected to conductors 238, 234, 240 and 236, respectively. Thus the lower end of resistor 232 will be at a low potential if the binary sum or difference of the two input digits is "zero." Conversely, the lower end of resistor 232 will be at a high potential if the binary sum or difference is a "one."

The lower end of a second resistor 242 is connected to ground through two parallel paths, one path comprising the series combination of the emitter-collector paths of transsistors 244 and 230 in series, and the other comprising the emitter-collector paths of transistors 246 and 226 in series. The bases of transistors 244 and 246 are connected to conductors 238 and 240, respectively. It can be seen from an inspection of Fig. 4 that the lower end of resistor 242 will be at a low potential if one digit on the two sets of input leads 234—236 and 238—240 is "one" and the other is "zero," that is, if the binary sum or difference of the two digits is "one." However, this is equivalent to saying that the lower end of resistor 242 will be at a low potential if the sum of the two input digits plus a carry of "one" is equal to "zero" since a sum of "one" plus a carry of "one" is "zero" with a carry of "one." Therefore the circuit just described is arranged to provide a high potential at the base of transistor 248 if the sum of the input digits plus a carry of "zero" is "one," and to provide a high potential at the base of transistor 250 if the sum of the input digits plus a carry of "one" is "one." Output conductor 252 is connected to ground through the serially connected emitter-collector paths of transistors 254 and 248. Conductor 256, which connects with the base of transistor 254, may connect to the "carry equals zero" conductor of the preceding group, for example conductor 36 or the output of "or" buffer 80 of Fig. 1. The bistable circuit (not shown) associated with conductor 252 may be so arranged that it is set to register a "one" if conductor 252 is at or near ground potential. Thus transistors 248 and 254 perform the function of one of the "and" gates in circuits 56 or 74, for example, of Fig. 1. Similarly, output conductor 258 is connected to ground through the serially connected emitter-collector paths of transistors 260 and 250. The base of transistor 260 is connected to conductor 262 which is energized by the "carry equals one" output of the preceding group. Thus transistors 250 and 260 perform the function of one of the "and" gates in circuits 60 or 78, for example, in Fig. 1.

The portion of the first stage to the left of broken line 222 generates the four possible carry signals, i.e. a carry of "one" or "zero" assuming an input carry of "zero," and a carry of "zero" or "one" assuming that the input carry is a "one." In this portion of the circuit one end of resistor 270 is connected to a source of supply potential represented by the symbol —V*cc*. The other end of this resistor 270 is connected to ground through three parallel paths. One path comprises the emitter-collector paths of transistors 271 and 272 in series, the second path comprises the emitter-collector path of transistors 273 and 275 in series and the third path comprises simply the emitter-collector path of transistor 274. A high potential at the lower end of resistor 270 indicates a carry or borrow of "zero," assuming an input carry of "one." Conversely a low potential at the lower end of resistor 270 indicates a carry or borrow of "one," again assuming an input carry of "one." It can be shown that, assuming an input carry or borrow of "one," a carry or borrow of "one" will always be present if the addend or subtrahend digit is "one." Therefore the base of transistor 274 is connected to input conductor 236. It is also possible to show that a carry of "one" will always be present if the augend digit is "one." Therefore the bases of transistors 271 and 272 are connected to the "add" program lead 284 and lead 240, respectively. If both the augend and addend digits are "one" there are two low impedance paths from the lower end of resistor 270 to ground, one through transistors 271 and 272 and the other through transistor 274. This will have no effect on the operation of the circuit since either one of the paths alone is a low impedance compared to resistor 270. Finally it can be shown that a borrow of "one" will always be present if an input borrow of "one" is assumed and if the minuend digit is "zero." Therefore the bases of transistors 273 and 275 are connected to the "subtract" program lead 286 and to input lead 238. A "carry equals one" signal is generated by connecting the lower end of resistor 270 to the input of an inverter comprising transistor 278 and resistor 280. The "carry equals one" signal, if present, will appear on conductor 282 which is connected to the output of the inverter.

The remainder of the right hand stage is employed in generating a carry signal, assuming an input carry of "zero." This carry will be indicated by a signal on conductor 290 if it is a "zero" or on conductor 292 if it is a "one." Again conductor 290 is connected to conductor 292 through an inverter comprising transistor 294 and resistor 296. Since conductor 290 is to be at a low potential if the carry is a "one," it is connected to the lower end of a resistor 300 which has its upper end connected to a source of supply potential again represented by the symbol —V*cc*. The lower end of resistor 300 is connected to ground through two paths, one path comprising the emitter-collector paths of transistors 302, 304 and 306 in series and the other path comprising the emitter-collector paths of transistors 308, 310 and 306 in series. Again, each of these transistors will present a low impedance between emitter and collector if its base is energized but will present a high impedance if its base is not energized. The bases of transistors 302, 304, 306, 308 and 310 are connected to conductor 286, 238, 236, 284 and 240, respectively. Thus one path from resistor 300 to ground is completed if the subtract conductor 286 is energized, the minuend digit is a "zero," i.e. conductor 238 is energized, and the subtrahend digit is a "one"; i.e. conductor 236 is energized. The other path is completed if the add conductor 284 and conductors 236 and 240 are energized. Conductors 236 and 240 are energized if the two input digits are "ones." It can be shown that these two conditions are the only two conditions that will give an output carry or borrow of "one" if an input carry or borrow of "zero" is assumed.

The left hand stage is similar to the right hand stage but more complex as a result of the two pairs of carry input signals from the right hand stage. In this stage the signal representing a sum digit of "one" with an assumed carry of "zero" from the preceding group appears at conductor 320. It should be remembered that the two stages of Fig. 4 are of the same group and that the carry that is assumed is the carry output of the preceding group and not the preceding stage within a group. The carry output of the preceding stage within a group is communicated by a direct connection to the following stage. Conductor 322 is energized if the sum or difference digit is "one" for an assumed carry or borrow input of "one." Transistors 324 and 326 perform a gating function similar to transistors 248 and 254. Transistors 328 and 330 correspond to transistors 250 and 260 of the right hand stage. The conductors to the bases of transistors 326 and 330 have been numbered to correspond to the conductors connected to the bases of transistors 254 and 260 since they are energized from the same source. The lower end of resistor 332 is connected to ground through four paths, these paths comprise the serially connected emitter-collector paths of the following transistors:

Path 1—transistors 334, 336 and 338
Path 2—transistors 334, 340 and 342
Path 3—transistors 344, 346 and 342
Path 4—transistors 344, 348 and 338

Conductors 350 and 352 connect to the same register as conductors 234 and 236 but to the next higher order bi-stable circuit in this register. Conductor 350 is energized if the digit registered by this bi-stable circuit is a "zero" and conductor 352 is energized if this digit is a "one." Similarly, conductors 354 and 356 connect to the same registers as conductors 238 and 240 but again to the next higher order bi-stable circuit. Conductor 354 is energized to represent a "zero" and conductor 356 is energized to represent a "one."

The bases of the following transistors are connected to the conductors indicated:

| | | | | | | | |
|---|---|---|---|---|---|---|---|
| Transistor | 334 | 336 | 338 | 340 | 342 | 344 | 346 |
| Conductor | 292 | 354 | 352 | 356 | 350 | 290 | 354 |

Resistor 360 connects conductor 322 to a source of supply potential. There are four possible paths from the lower end of resistor 360 to ground. These paths are through the serially connected emitter-collector paths of the following transistors:

Path 5—transistors 362, 336 and 338
Path 6—transistors 362, 340 and 342
Path 7—transistors 364, 366 and 368
Path 8—transistors 364, 370 and 372

The conductors connected to the bases of the transistors in paths 5 through 8 are as shown below:

| | | | | | | |
|---|---|---|---|---|---|---|
| Transistor | 362 | 364 | 366 | 368 | 370 | 372 |
| Conductor | 282 | 276 | 356 | 352 | 354 | 350 |

The carry or borrow output for an assumed carry input of "zero" appears on conductors 374 and 376. Conductor 374 is energized to indicate a carry output of "one" and conductor 376 is energized to indicate a carry output of "zero." Conductor 376 is energized by a connection to the lower end of resistor 378 which has its upper end connected to a source of supply potential. The lower end of resistor 378 is connected to ground through the following paths:

Path 9—transistors 380, 382, 348 and 338
Path 10—transistors 380, 382, 346 and 342
Path 11—transistors 380, 384 and 386

It should be noted that these three paths all include transistor 380 which has its base connected to the subtract conductor 286. The lower end of resistor 378 is also connected to ground through the following paths which include transistor 388 which has its base connected to the add conductor 284:

Path 12—transistors 388, 390 and 386
Path 13—transistors 388, 392, 394 and 396
Path 14—transistors 388, 392, 398 and 400

The conductors connected to the bases of the transistors associated with resistor 378 are as follows:

| | | | | | | | | | | | |
|---|---|---|---|---|---|---|---|---|---|---|---|
| Transistor | 380 | 382 | 384 | 386 | 388 | 390 | 392 | 394 | 396 | 398 | 400 |
| Conductor | 286 | 292 | 354 | 352 | 284 | 356 | 292 | 356 | 350 | 354 | 352 |

If any one of these paths is a low impedance, the lower end of resistor 378 and conductor 376 will be at a potential near ground indicating that no carry of "zero" is present, i.e. that a carry of "one" is present. The lower end of resistor 378 is connected to conductor 374 through the inverter comprising transistor 402 and resistor 404. Therefore, if conductor 376 is at a low potential, then conductor 374 will be at a high potential indicating that a carry of "one" is present.

The carry or borrow output for an assumed carry of "one" appears on conductors 406 and 408. Conductor 406 is energized if the carry or borrow is a "one" and conductor 404 is energized if the carry or borrow digit is a "zero." Conductor 408 is energized by connecting it to the lower end of resistor 410 which has its other end connected to a source of supply potential. The potential of conductor 408 is controlled by connecting the lower end of resistor 410 to ground through the following paths:

Path 15—transistors 412, 414, 366 and 368
Path 16—transistors 412, 414, 370 and 372
Path 17—transistors 412, 416 and 418

All three of these paths include transistor 412 which has its base connected to the subtract lead 286.

The lower end of resistor 410 is also connected to ground through the following paths, all of which include transistor 420 which has its base connected to the add conductor 284:

Path 18—transistors 420, 422 and 418
Path 19—transistors 420, 424, 394 and 396
Path 20—transistors 420, 424, 398 and 400

The conductors connected to the bases of the transistors associated with resistor 410 are as follows:

| | | | | | | | |
|---|---|---|---|---|---|---|---|
| Transistor | 412 | 414 | 416 | 418 | 420 | 422 | 424 |
| Conductor | 286 | 282 | 354 | 352 | 284 | 356 | 282 |

The lower end of resistor 410 and conductor 408 will be at or near ground potential if any one of the paths associated therewith presents a low impedance as a result of a signal supplied to the bases of all transistors in that path. It is to be understood that as used in this specification the term "low impedance" means low or small in comparison to any resistor connected in series with the path, for example resistor 410. An inverter comprising transistor 426 and resistor 428 connects the lower end of resistor 410 to conductor 406. This inverter causes conductor 406 to be at a high potential if conductor 408 is at a low potential and at a low potential if conductor 408 is at a high potential.

In groups having more than two stages the additional stages would be identical to the left hand stage just described. The only connections between adjacent stages are the four carry conductors. Therefore the final stage of any group may be the same as any intermediate stage.

It is believed that the circuit of Fig. 4 requires very little additional explanation. As the above description points out, each stage receives an input from a bi-stable circuit in each of two registers. In the preferred form of the invention each input comprises two conductors one of which is energized to represent a "zero" and the other of which is energized to represent a "one". However, a single conductor may be employed to transmit a signal representing one of these two values and the signal representing the other value may be developed by an inverter which has its input connected to the single conductor.

The circuit of Fig. 4 provides two sets of sum or difference digits. Each stage contributes one digit to each set. One set of digits represents the binary sum of the numbers registered by the bi-stable elements associated with that group. The other set represents this sum plus "one" or the difference minus "one", that is, it is the sum or difference resulting from an assumed carry or borrow of "one" at the input of the group. Although only the first circuit of the group is arranged to take into account this assumed carry of "one", its effect is transferred to the higher order stages by the carry signals propagated from the lower order stages to the higher order stages. In Fig. 4 the first sum or difference is gated out by energizing conductor 256 which renders transistors 326 and 254 conductive. The second sum or difference signal is gated out by energizing conductor 262 which renders transistors 330 and 260 conductive. Since conductors 256 and 262 are energized by the "zero" carry and "one" carry outputs of the preceding stage only one of these conductors may be energized at a time.

The circuit of Fig. 4 is caused to add the numbers in the two registers associated therewith by energizing conductor 284. Subtraction is accomplished by energizing conductor 286. Again only one of these two conductors should be energized at a time. The circuits are such that if conductor 284 is energized, a carry of "one" is assumed in a portion of the first stage and carry digits are propagated from the lower order stages to the higher order stages by way of conductors 276, 282, 290 and 292, for example. If conductor 286 is energized a borrow of "one" is assumed in the first stage and a borrow ripple is propagated through the same interstage connections that propagated the carry. As explained previously, no carry signal per se is transferred from adder-subtracter 21, for example, to adder-subtracters **22*a* and 22*b*. Instead, adder-subtracter 22*a* provides a signal representing the sum (or difference) of the fourth to the sixth digits of registers 12 and 14 with no carry (or borrow) input to the lowest significant digit column. If the actual carry output of adder-subtracter 21 is a "one", the signal from adder-subtracter 22*a* will not represent a correct portion of the total output signal therefore this signal will be discarded. The discarding of this signal is accomplished in gate 56 which is blocked if the carry output of adder-subtracter 21 is a "one". Similarly, adder-subtracter 22*b* provides a signal representing the sum (or difference) of the fourth to the sixth digits of registers 12 and 14 with a carry (or borrow) input of "one". Thus, if the adder-subtracter stage 22*a* provides an incorrect portion of the total sum signal, stage 22*b* must provide a correct portion of the total sum signal since there are only two possible carry signals from adder-subtracter stage 21**, i.e. either a "zero" or a "one".

In the final stage of a group, one of the two pairs of carry or borrow signals is blocked by appropriate gate circuits associated with conductors 262 and 256. These gating circuits may take the form shown in Fig. 3.

Again the combined adder-subtracter of Fig. 1 may be simplified to a dual path adder or a dual path subtracter in the manner described in connection with the explanation of Fig. 2. Also, other combinations of paths may be employed in adder circuits, subtracter circuits or combined adder-subtracter circuits without departing from the spirit and scope of the present invention. It also lies within the scope of the invention to replace the transistors shown in Fig. 4 with other known forms of switching elements and to provide any additional control or biasing circuits as may be required by these switching elements.

The circuits shown relate to binary adder-subtracter circuits. However, it lies within the scope of the invention to arrange adder-subtracters of any other radix in the manner shown in Fig. 1. It will be remembered that the carry or borrow digits for any radix are still limited to the values "zero" and "one". In the appended claims the term "adder-subtracter" is used as a generic term covering adders and subtracters individually. The term "combined adder-subtracter" is employed to describe a circuit which will perform addition upon the application of an appropriate signal or subtraction upon the application of a different signal. The term "carry-borrow signal" is used as, a generic term encompassing a carry signal and a borrow signal, individually. The term "result" is employed as a generic term for a sum and a difference, individually. The hyphenated term "sum-difference" is also employed as a generic term covering either a sum or a difference but not both at once.

While there have been described what are at present considered to be the preferred embodiments of the invention, it will be apparent that various modifications and other embodiments thereof will occur to those skilled in the art within the scope of the invention. Accordingly I desire the scope of my invention to be limited only by the appended claims.

What is claimed is:

1. An arithmetic computation circuit having a shortened carry propagation time, comprising means for dividing each of two numbers into *n* corresponding digit groups, at least one digit group of each number including more than one binary digit, a first plurality of means for combining each digit group of one number with the corresponding digit group of the other number by a single selected arithmetic operation chosen from the two arithmetic operations addition and subtraction and with an assumed carry-borrow input of zero, a second plurality of means for simultaneously combining each digit group except the lowest order digit group of the said first number with the corresponding digit group of the other number by the same selected arithmetic operation and with an assumed carry-borrow input of one to each group, thereby to provide a first result signal and a carry-borrow signal for said lowest order group corresponding to the result signal and carry-borrow signal which would result from the performing of the same arithmetic function on the said lowest order portions of said two numbers, and to provide a first result signal and a corresponding carry-borrow signal and a second result signal and a corresponding carry-borrow signal for each group except said lowest order group, one of said result signals and the corresponding carry-borrow signal being a portion of the result signal and the corresponding carry-borrow signal which would result from performing the same arithmetic operation on said two numbers, an output circuit, means for supplying the result signal of said combining means for said lowest order group of digits to said output circuit, means responsive to the carry-borrow output signal of the combining means for the lowest order group for selecting the result signal and the corresponding carry-borrow signal of the combining means of the next higher order group resulting from an assumed carry-borrow signal for the higher order combining means corresponding to the carry-borrow output signal of said lowest order combining means, means responsive to the selected carry-borrow signals of each of said combining means except said lowest order combining means for selecting the result signal and the corresponding carry-borrow signal of the next higher order combining means resulting from an assumed carry-borrow signal of the higher order combining means corresponding to the selected carry-borrow output signal of the lower order combining means, and means for supplying said selected result signals to said output circuit.

2. A parallel adder circuit having a shortened carry propagation time, comprising means for dividing each of two numbers into *n* corresponding digit groups, at least one digit group in each of the two numbers including more than one digit, a first plurality of means for adding each digit group of one number to the corresponding digit group of the other number with an assumed carry input of zero, a second plurality of means for simultaneously adding each digit group except the lowest order digit group of the said first number to the corresponding digit group of the other number with an assumed carry input of one to each group, thereby to provide a first sum signal and a carry signal for said lowest order group corresponding to the sum signal and carry signal which would result from adding the said lowest order portions of said two numbers, and to provide a first sum signal and a corresponding carry signal and a second sum signal and a corresponding carry signal for each group except said lowest order group, one of said sum signals and the corresponding carry signal being a portion of the sum signal and the corresponding carry signal which would result from adding said two numbers, an output circuit, means for supplying the sum signal of said adding means for said lowest order group of digits to said output circuit, means responsive to the carry output signal of the adding means for the lowest order group for selecting the sum signal and the corresponding carry signal of the adding means of the next higher order group resulting from an assumed carry signal for the higher order adding means corresponding to the carry output signal of said lowest order adding means, means responsive to the selected carry signals of each of said adding means except said lowest order adding means for selecting the sum signal and the corresponding carry signal of the next higher order adding means resulting from an assumed carry signal of the higher order adding means corresponding to the selected carry output signal of the lower order adding means, and means for supplying said selected sum signals to said output circuit.

3. An arithmetic computation system comprising a plurality of computation circuits each arranged to perform the same arithmetic function, said arithmetic function being a single arithmetic function chosen from the two arithmetic functions addition and subtraction, means for distributing signals indicative of the individual digits of first and second numbers among said computation circuits, each of said numbers being divisible into a like plurality of partial numbers, at least one of said partial numbers having more than one digit, each of said computation circuits receiving signals representing a partial number taken from said first number and a corresponding partial number taken from said second number, each of said computation circuits providing at a first output connection signals indicative of the digits in the result of the performance of said function on the two partial numbers supplied to said computation circuit, each of said computation circuits providing at a second output connection signals indicative of the carry-borrow resulting from the performance of said function, each of said computation circuits except the computation circuit receiving the lowest order partial numbers providing at a third output connection signals indicative of the digits in the result of the performance of said function on the two partial numbers supplied to said computation circuit and an input carry-borrow of one, said last-mentioned computation circuits each providing at a fourth output connection signals indicative of the carry-borrow resulting from the performance of said function on the two partial numbers supplied thereto and an input carry-borrow of one, an output circuit, gate means connecting said first and third output connections of said computation circuits to said output circuit, said gate means being responsive to carry-borrow signals at said second and fourth output connections to permit the passage of the result signals from only a selected one of said first and third output connections of each computation circuit to said output circuit.

4. An improved combined adder-subtracter system comprising a plurality of combined adder-subtracter circuits, means for distributing signals indicative of the individual digits of first and second numbers among said circuits, each of said numbers being divisible into a like plurality of partial numbers, at least one partial number from each of said first and second numbers including more than one digit, each of said circuits receiving signals representing a partial number taken from said first number and a corresponding partial number taken from said second number, means for setting said combined adder-subtracter circuits selectively to add or subtract, each of said circuits providing at a first output connection signals indicative of the digits in the sum or difference of the two partial numbers supplied to said circuit, each of said circuits providing at a second output connection signals indicative of the carry or borrow resulting from the addition or subtraction, respectively, of the two partial numbers supplied thereto, each of said circuits except the circuit receiving the lowest order partial numbers providing at a third output connection signals indicative of the digits in the sum or difference of the two partial numbers supplied to said circuit and an input carry or borrow of one, said last-mentioned circuits each providing at a fourth output connection signals indicative of the carry or borrow resulting from the addition or subtraction, respectively, of the two partial numbers supplied thereto and an input carry or borrow of one, an output circuit, gate means connecting said first and third output connections of said circuits to said output circuit, said gate means being responsive to carry or borrow signals at said second and fourth output connections to permit the passage of the sum or difference signals from only a selected one of the two sum output connections of each circuit to said output circuit.

5. An improved adder system comprising a plurality of adder circuits, at least one of said adder circuits being capable of adding a number having more than one digit, means for distributing signals indicative of the individual digits of first and second numbers to be added among said adder circuits, each of said numbers being divisible into a like plurality of partial numbers, each of said adder circuits receiving signals representing a partial number taken from said first number and a corresponding partial number taken from said second number, each of said adder circuits providing at a first output connection signals indicative of the digits in the sum of the two partial numbers applied to said adder circuit, each of said adder circuits providing at a second output connection signals indicative of the carry resulting from the addition of the two partial numbers supplied thereto, each of said adder circuits except the adder circuit receiving the lowest order partial numbers providing at a third output connection signals indicative of the digits in the sum of the two partial numbers supplied to said adder circuit and an input carry of one, said last-mentioned adder circuits each providing at a fourth output connection signals indicative of the carry resulting from the addition of the two partial numbers supplied thereto and an input carry of one, an output circuit, gate means connecting said first and third output connections of said adder circuits to said output circuit, said gate means being responsive to carry signals at said second and fourth output connections to permit the passage of the sum signals from only a selected one of the two sum output connections of each adder circuit to said output circuit.

6. A parallel binary adder comprising a plurality of groups of adder stages, means for distributing the signals indicative of the individual digits of first and second numbers to be added among said groups, each of said groups receiving signals representing a first partial number comprising a selected succession of digits of said first number and a second partial number comprising the corresponding succession of digits of said second number, at least one of said partial numbers comprising more than one digit, the stages in the group receiving signals representing the lowest order digits being arranged in a single multi-digit adder circuit, said single circuit providing at separate outputs signals indicative of the sum and carry, respectively, resulting from the addition of the two partial numbers supplied thereto, each of said groups except said last-mentioned group being arranged in two multi-digit adder circuits, each circuit of each group receiving signals representing said first and second partial numbers supplied to said group, one circuit providing at separate outputs signals indicative, respectively, of the sum and carry resulting from the addition of the two partial numbers supplied thereto, the other circuit providing signals indicative of the sum and carry resulting from the addition of the two partial numbers supplied thereto and an input carry of "one," an output circuit, and gate means connecting the sum outputs of each of said adder circuits to said output circuits, said gate means being responsive to the carry output signals of the several adder circuits to permit the passage of the sum signals from only a selected one of the adder circuits of each group to said output circuit.

7. An improved subtracter system comprising $n$ subtracter circuits, at least one of said subtracter circuits being a multidigit subtracter circuit, where $n$ is an integer greater than one, means for distributing signals indicative of the individual digits of first and second numbers to be subtracted among said subtracter circuits, each of said numbers being divisible into $n$ groups of digits, each digit group including at least one digit, at least one digit group including more than one digit, each of said subtracter circuits receiving signals representing a digit group of said first number and a corresponding digit group of said second number, the subtracter circuit receiving the lowest order digit groups of said first and second numbers providing at a first output connection signals indicative of the digits in the difference of the two digit groups supplied thereto and further providing at a second output connection signals indicative of the borrow resulting from the subtraction of the two digit groups supplied thereto, each of the other subtracter circuits providing similar signals at first and second output connections thereof and further providing at a third output connection signals indicative of the digits in the difference of the two digit groups supplied thereto and an input borrow of "one" and also providing at a fourth output connection signals indicative of the borrow resulting from the subtraction of the two digit groups supplied thereto and an input borrow of one, an output circuit, $n$ first gate means each connecting said first output connection of a corresponding one of said subtracter circuits to said output circuit, $n-1$ second gate means each connecting circuit third output connections of a corresponding one of said subtracter circuits to said output circuit and means associated with said second and said fourth output connections of said subtracter circuits for controlling the operation of said first and second gate means.

8. An improved adder system comprising $n$ adder circuits, where $n$ is an integer greater than one, means for distributing signals indicative of the individual digits of first and second numbers to be added among said adder stages, each of said numbers being divisible into $n$ groups of digits, each digit group including at least one digit, at least one of said digit groups including more than one digit, each of said adder circuits receiving signals representing a digit group of said first number and a corresponding digit group of said second number, the adder circuit receiving the lowest order digit groups of said first and second numbers providing at a first output connection signals indicative of the digits in the sum of the two digit groups supplied thereto and further providing at a second output connection signals indicative of the carry resulting from the addition of the two digit circuits supplied thereto, each of the other adder groups providing similar signals at first and second output connections thereof and further providing at a third output connection signals indicative of the digits in the sum of the two digit groups supplied thereto and an input carry of one and also providing at a fourth output connection signals indicative of the carry resulting from the addition of the two digit groups supplied thereto and an input carry of one, an output circuit, $n$ first gate means each connecting said first output connection of a corresponding one of said adder circuits to said output circuit, $n-1$ second gate means each connecting said third output connections of a corresponding one of said adder circuits to said output circuit and means associated with said second and said fourth output connections of said adder circuits for controlling the operation of said first and second gate means.

9. An improved combined adder-subtractor circuit comprising $n$ adder-subtracter groups where $n$ is an integer greater than one, means for distributing signals indicative of the individual digits of first and second numbers to be added or subtracted among said adder-subtracter groups, each of said numbers being divisible into $n$ groups of digits, each digit group including at least one digit, each of said adder-subtracter groups receiving signals representing a digit group of said first number and a corresponding digit group of said second number, means for setting said adder-subtracter groups, selectively, to add or subtract, the adder-subtracter group receiving the lowest order digit groups being arranged to provide a set of output signals, said set including signals representing the digits in the sum or difference and carry or borrow resulting from the addition or subtraction, respectively, of the two digit groups supplied thereto, each of said other adder-subtracter groups being arranged to provide first and second sets of output signals, said first set including signals representing the digits in the sum or difference and carry or borrow resulting from the addition or subtraction, respectively, of the two digit groups supplied thereto, and said second set including signals representing the digits in the sum or difference and carry or borrow resulting from the addition or subtraction, respectively, of the two digit groups supplied thereto and an input carry or borrow of one, means responsive to the carry or borrow output of said adder-subtracter group receiving the lowest order digit groups for selecting one of said two sets of signals in the next higher order adder-subtracter group, means responsive to the carry or borrow signal in the selected set of each of said other groups for selecting one of said two sets of signals of the next higher group, an output circuit and means for supplying the sum or difference signals of said lowest order group and the sum or difference signals in the selected sets of all said other groups to said output circuit.

10. An improved adder circuit comprising $n$ adder groups where $n$ is an integer greater than one, means for distributing signals indicative of the indvidual digits of first and second numbers to be added among said adder groups, each of said numbers being divisible into $n$ groups of digits, each digit group including at least one digit, each of said adder groups receiving signals representing a digit group of said first number and a corresponding digit group of said second number, the adder group receiving the lowest order digit groups being arranged to provide a set of output signals, said set including signals representing the digits in the sum and carry resulting from the addition of the two digit groups supplied thereto, each of said other adder groups being arranged to provide first and second sets of output signals, said first set including signals representing the digits in the sum and carry resulting from the addition of the two digit groups supplied thereto, and said second set including signals representing the digits in the sum and carry resulting from the addition of the two digit groups supplied thereto and an input carry of one, means responsive to the carry output of said adder group receiving the lowest order digit groups for selecting one of said two sets of signals in the next higher order adder group, means responsive to the carry signal in the selected set of each of said other groups for selecting one of said two sets of signals of the next higher group, an output circuit and means for supplying the sum signals of said lowest order group and the sum signals in the selected sets of all said other groups to said output circuit.

11. An improved subtracter circuit comprising $n$ subtracter groups where $n$ is an integer greater than one, means for distributing signals indicative of the individual digits of first and second numbers to be subtracted among said subtracter groups, each of said numbers being divisible into $n$ groups of digits, each digit group including at least one digit, each of said subtracter groups receiving signals representing a digit group of said first number and a corresponding digit group of said second number, the subtracter group receiving the lowest order digit groups being arranged to provide a set of output signals, said set including signals representing the digits in the difference and borrow resulting from the subtraction of the two digit groups supplied thereto, each of said other subtracter groups being arranged to provide first and second sets of output signals, said first set including signals representing the digits in the difference and borrow resulting from the subtraction of the two digit groups supplied thereto, and said second set including signals representing the digits in the difference and borrow resulting from the subtraction of the two digit groups supplied thereto and an input borrow of one, means responsive to the borrow output of said subtracter group receiving the lowest order digit groups for selecting one of said two sets of signals in the next higher order subtracter group, means responsive to the borrow signal in the selected set of each of said other groups for selecting one of said two sets of signals of the next higher group, an output circuit and means for supplying the difference signals of said lowest order group and the difference signals in the selected sets of all said other groups to said output circuit.

12. An improved adder circuit comprising $n$ adder groups where $n$ is an integer greater than one, means for distributing signals indicative of the individual digits of first and second numbers to be added among said adder groups, each of said numbers being divisible into $n$ groups of digits, each digit group including at least one digit, each of said adder groups receiving signals representing a digit group of said first number and a corresponding digit group of said second number, the adder group receiving the lowest order digit group having a first set of outputs including first and second outputs, said first output supplying signals indicative of the carry and said second output supplying signals indicative of the digits in the sum resulting from the addition of the two digit groups supplied thereto, the others of said adder groups having a first set of outputs corresponding to said aforementioned first set of outputs and a second set of outputs including third and fourth outputs, said third output supplying signals indicative of the carry and said forth output supplying signals indicative of the digits of the sum resulting from the addition of the two digit groups supplied thereto and an input carry of one, means connecting said first output and said third output, if present, of each adder group to the next higher order adder group, an output circuit, means connecting said second output and said fourth output, if present, of each adder group to said output circuit, each of said other adder groups including means associated therewith and responsive to a signal indicative of a carry of zero from the next lower order adder group for blocking signals from said second set of outputs of the adder group associated therewith and responsive to a signal indicative of a carry of one from the next lower order adder group for blocking signals from said first set of outputs of the adder group associated therewith.

13. An improved adder-subtracter circuit comprising $n$ adder-subtracter groups where $n$ is an integer greater than one, means for setting said groups, selectively, to add or subtract, means for distributing signals indicative of the individual digits of first and second numbers to be combined among said adder-subtracter groups, each of said numbers being divisible to $n$ groups of digits, each digit group including at least one digit, each of said adder-subtracter groups receiving signals representing a digit group of said first number and a corresponding digit group of said second number, the adder-subtracter group receiving the lowest order digit group having a first set of outputs including first and second outputs, said first output supplying signals indicative of the carry-borrow and said second output supplying signals indicative of the digits in the sum-difference resulting from the addition-subtraction of the two digit groups supplied thereto, the others of said adder-subtracter groups having a first set of outputs corresponding to said aforementioned first set of outputs and a second set of outputs including third and fourth outputs, said third output supplying signals indicative of the carry-borrow and said fourth output supplying signals indicative of the digits of the sum-difference resulting from the addition-subtraction of the two digit groups supplied thereto and at input carry-borrow of one, means connecting said first output and said third output, if present, of each adder-subtracter group to the next higher order adder-subtracter group, an output circuit, means connecting said second output and said fourth output, if present, of each adder-subtracter group to said output circuit, each of said other adder-subtracter groups including means associated therewith and responsive to a signal indicative of a carry-borrow of zero from the next lower order adder-subtracter group for blocking signals from said second set of outputs of the adder-subtracter group associated therewith and responsive to lower order adder-subtracter group for blocking signals from said first set of outputs of the adder-subtracter group associated therewith.

14. An arithmetic computation circuit having a shortened carry propagation time, comprising means for dividing each of two numbers to be combined into $n$ corresponding digit groups, at least one of said digit groups including more than one digit, a first plurality of means for combining each digit group of one number with the corresponding digit group of the other number by an arithmetic operation selected from the group comprising addition and subtraction and with an input carry-borrow digit of zero, a second plurality of means for simultaneously combining each digit group except the lowest order digit group of said first number with the corresponding digit group of the other number by the same arithmetic operation and with an assumed input carry-borrow digit of "one" to each group, thereby to provide a first result signal and a corresponding output carry-borrow digit signal for the lowest order group and a first result signal and a corresponding output carry-borrow digit signal and a second result signal and a corresponding output carry-borrow digit signal for each group except said lowest order group, means for supplying the result signal of said combining means for said lowest order group to said output circuit, means responsive to the output carry-borrow digit signal of the combining means for said lowest order group for supplying only a selected one of said result signals of the combining means of the next higher order group to said output circuit, the result signal selected being determined by the value of the output carry-borrow digit signal supplied by said combining means for said lowest order group, means responsive to the output carry-borrow digit signal corresponding to the selected result signal of each of said combining means except said lowest order combining means for supplying only a selected result signal of the next higher order combining means to said output circuit, the result signal selected being determined by the value of the output carry-borrow digit signal corresponding to the selected result signal of the combining means for the lower order group.

15. A parallel adder circuit having a shortening carry propagation time, comprising means for dividing each of two numbers to be added into $n$ corresponding digit groups, at least one of said digit groups for each number including more than one digit, a first plurality of means for adding each digit group of one number to the corresponding digit group of the other number with an assumed carry input of zero, a second plurality of means for simultaneously adding each digit group except the lowest order digit group of said first number to the corresponding digit group of the other number with an assumed carry input of one to each group, thereby to provide a first sum signal and a carry signal for said lowest order group and to provide a first sum signal and a corresponding carry signal and a second sum signal and a corresponding carry signal for each group except said lowest order group, an output circuit, means for supplying the sum signal of said adding means for said lowest order digit group to said output circuit, means responsive to the carry output signal of the adding means for said lowest order digit group for supplying only one sum signal of the adding means for the next higher order digit group to said output circuit, the sum signal selected being determined by the value of the carry output signal of the adding means for said lowest order digit group, and means responsive to the carry output signals corresponding to the selected sum signals of each of said adding means except said lowest order adding means for supplying a selected sum signal of the next higher order adding means to said output circuit, the sum signal selected being determined by the value of the output carry signal of the adding means for the lower order adding means.

16. An arithmetic computation system comprising a plurality of computation circuits each arranged to perform the same arithmetic function, said arithmetic function being a single arithmetic function chosen from the two arithmetic functions addition and subtraction, means for distributing signals indicative of the individual digits of first and second multidigit numbers to be combined among said computation circuits, each of said two numbers being divisible into a like plurality of partial numbers, said signal distributing means supplying to each of said computation circuits signals representing a partial number derived from said first number and a corresponding partial number derived from said second number, the partial numbers supplied to at least one of said computation circuits comprising a multidigit partial number, each of said computation circuits providing at a first output connection signals indicative of the digits generated in the result of the performance of said selected function on the two partial numbers supplied to that computation circuit, each of said computation circuits providing at a second output connection signals indicative of the carry-borrow digit generated in the performance of said selected function, each of said computation circuits except the computation circuit receiving the lowest order partial numbers providing at a third output connection signals indicative of the result digits generated in the performance of said selected function upon the two partial numbers supplied to that computation circuit and an input carry-borrow digit of one, said last-mentioned computation circuits each providing at a fourth output connection signals indicative of the carry-borrow digit generated from the performance of said selected function on the two partial numbers supplied thereto and an input carry-borrow digit of one, an output circuit, signal actuatable gate means connecting said first and third output connections of said computation circuits to said output circuit, and means connecting said second and fourth output connections of said computation circuits to control inputs of selected ones of said gate means, said gate means being responsive to said carry-borrow digit signals at said second and fourth output connections to permit the result digit signals from only a selected one of said first and third output connections of each of said computation circuits to pass to said output circuits.

References Cited in the file of this patent

UNITED STATES PATENTS

| | | |
|---|---|---|
| 2,364,540 | Luhn | Dec. 5, 1944 |
| 2,601,281 | Hartley et al. | June 24, 1952 |
| 2,609,143 | Stibitz | Sept. 2, 1952 |
| 2,734,684 | Ross et al. | Feb. 14, 1956 |
| 2,803,401 | Nelson | Aug. 20, 1957 |